United States Patent
Miller (10) Patent No.: US 7,222,708 B2
(45) Date of Patent: May 29, 2007

(54) CLUTCH ACTUATOR

(75) Inventor: Bernhard Miller, Weil der Stadt (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/331,054

(22) Filed: Jan. 13, 2006

(65) Prior Publication Data

US 2006/0283683 A1 Dec. 21, 2006

Related U.S. Application Data

(63) Continuation of application No. PCT/EP04/07706, filed on Jul. 13, 2004.

(30) Foreign Application Priority Data

Jul. 15, 2003 (DE) ................. 103 31 927

(51) Int. Cl.
 *F16D 25/08* (2006.01)
 *F16D 13/75* (2006.01)

(52) U.S. Cl. ............... 192/85 C; 192/70.252; 192/91 R; 192/93 A; 192/94; 192/111.12

(58) Field of Classification Search ............ None
See application file for complete search history.

(56) References Cited

U.S. PATENT DOCUMENTS 2,055,258 A * 9/1936 McNeil ............ 74/110
2,574,204 A * 11/1951 Woody et al. ......... 192/93 A
2,700,444 A * 1/1955 Ahlen ............... 192/93 R
3,812,943 A * 5/1974 Quemerais ........... 192/93 A
4,934,503 A * 6/1990 Bacher et al. ........ 192/93 A
6,907,975 B2 * 6/2005 Doremus et al. ...... 192/91 A
2004/0031656 A1 2/2004 Maennle
2006/0081437 A1 * 4/2006 Puiu ................ 192/70.23

FOREIGN PATENT DOCUMENTS

DE 44 43 649 A1 6/1996
DE 100 14 225 A1 9/2001
EP 1 150 031 A1 10/2001

OTHER PUBLICATIONS

International Search Report dated Nov. 17, 2004 w/English Translation (4 pages).

* cited by examiner

*Primary Examiner*—Richard M. Lorence
(74) *Attorney, Agent, or Firm*—Crowell & Moring LLP (57) ABSTRACT

A clutch actuator is provided for operating a clutch between a drive motor and a gearbox on a motor vehicle, in particular a commercial vehicle, including a linearly operating pin, acting on a release mechanism which is coaxial to a mid-axis of the clutch. The pin is arranged in a plane essentially perpendicular to the mid-axis of the clutch and coupled eccentrically to a rotating body of a gear mechanism, converting the rotating movement thereof into a linear movement of the release mechanism.

25 Claims, 5 Drawing Sheets

CLUTCH ACTUATOR

CROSS REFERENCE TO RELATED APPLICATIONS

This application is a Continuation of PCT Application No. PCT/EP2004/007706, filed on Jul. 13, 2004, which claims priority of German Application No. 103 31 927.1, filed Jul. 15, 2003, the disclosure of which is expressly incorporated by reference herein.

BACKGROUND AND SUMMARY OF THE INVENTION

The invention relates to a clutch actuator for actuating a clutch between a drive engine and a transmission of a motor vehicle, in particular a commercial vehicle, including a linearly actuable pin which acts on a release mechanism which is coaxial with respect to a center axis of the clutch.

A clutch actuator of this type is known, for example, from DE 100 14 225 A1. A clutch actuator of this type is usually flanged onto the outside of the transmission housing and has a linearly actuated pin, which is arranged parallel to the center axis of the clutch and is coupled to one end of a disengagement lever which is mounted pivotably within the clutch housing, the other end of the disengagement lever actuating a clutch operator, for example a disengagement bearing, which is coaxial with respect to the clutch center axis. The disengagement lever is loaded with high forces and bending moments, for which reason it has large dimensions and is usually configured as a forging, which in turn causes relatively high manufacturing costs. Moreover, the disengagement lever offers only a low force transmission ratio, with the result that the clutch actuator has to be of correspondingly large dimensions.

DE 44 43 649 A1 discloses electric-motor actuation of a friction disk clutch, which is actuated constantly in the engagement direction by a clutch spring and is disengaged by a thrust ring which acts on the clutch spring. The thrust ring is supported on a housing of a disengagement bearing which can be adjusted by rotation about its axis. A toothing system is arranged on the circumference of the housing, into which toothing system a worm gear engages which is driven by an electronically actuated electric motor. It is disadvantageous here, however, that a relatively large, expensive and heavy electric motor has to be provided for relatively large clutches, as are used in commercial vehicles.

U.S. Pat. No. 2,055,258 A shows a device for actuating a friction clutch, in which device a rotational movement of a shaft is converted via an eccentric pin into a linear movement of a wedge of a wedge mechanism. The linear movement is converted, in turn, into an axial displacement of friction elements of the clutch. This construction is, however, relatively complex.

The present invention is based on developing a clutch actuator of the type mentioned above, in such a way that it is of simple and compact construction and at the same time has a high power density.

According to the invention, a clutch actuator is provided for actuating a clutch between a drive engine and a transmission of a motor vehicle, in particular a commercial vehicle, including a linearly actuable pin which acts on a clutch operator which is coaxial with respect to a center axis of the clutch. The pin is formed by a piston rod of a piston, which is actuated by a pressure medium, of a cylinder-piston unit and is arranged substantially in a plane which is perpendicular with respect to the center axis of the clutch, and is coupled eccentrically to a rotary element of a gear mechanism which converts its rotational movement into a linear movement of the clutch operator.

It is an advantage of the invention that the expensive disengagement lever can be dispensed with by virtue of the fact that the pin is arranged substantially in a plane which is perpendicular with respect to the center axis of the clutch, and is coupled to a rotary element of a gear mechanism which converts its rotational movement into a linear movement of the clutch operator. As the pin, which is present in any case, then replaces the disengagement lever but has to transmit only compressive forces instead of bending moments, it can be dimensioned as previously with a relatively small cross section. The omission of the disengagement lever makes it possible to arrange the clutch actuator, which is flanged onto the outside of the transmission housing of the drive engine in the prior art, at least partially within the housing. As a result, the installation space which is required is reduced advantageously.

Furthermore, substantially greater force transmission ratios can be realized by gear mechanisms which convert rotational movements into linear movements, such as spindle mechanisms or disks having intermeshing ramp-shaped toothing systems, than by the disengagement lever of the prior art. As a consequence, the clutch actuator has to apply lower actuation forces, which in turn makes a smaller clutch actuator possible. Moreover, gear mechanisms of this type have a very small overall size as a rule, which further reduces the required installation space.

In many clutch actuators, the clutch travel is detected by a distance measuring sensor, which measures, for example, the path which is traveled by the pin. On account of the greater force transmission ratio which is made possible by the gear mechanism used within the context of the invention, substantially longer actuating paths for the pin result. As a result, the required resolution of the distance measuring sensor is reduced, which permits the use of a cheaper distance measuring system.

The pin is formed by a piston rod of a piston of a cylinder-piston unit, which is actuated by pressure medium. The pressure medium is a hydraulic fluid or compressed air. The clutch is then actuated by applying pressure to a pressure chamber of the cylinder-piston unit of the clutch actuator or relieving the latter of pressure. A clutch actuator, which is configured in this way, can be used both alone and in combination with an automated change speed gearbox, in which the clutch pedal is omitted.

Advantageous developments and improvements of the invention are described and claimed herein.

In order to realize the eccentric articulation or coupling of the piston rod on the rotary element, an imaginary extension of the piston rod can be spaced apart a little from the center axis of the rotary element.

In the clutch actuators of the prior art, every individual working stroke of the clutch actuator always includes the clutch actuation stroke, which is necessary for the actuation of the clutch and, in addition, a wear tracking stroke to compensate for the clutch wear. This means that the working stroke becomes larger and larger as the wear increases, and the clutch actuator, accordingly, has to be designed for the working stroke which includes the wear tracking stroke corresponding to the overall permissible wear in the most unfavorable case and, in addition, the normal clutch actuation stroke. This gains even more significance if the maximum wear tracking stroke is substantially larger than the clutch actuation stroke in practice, for example in commercial vehicles. As a consequence, the known clutch actuator has a relatively large overall size and is expensive to manufacture.

According to one particularly preferred embodiment of the invention, the initial position of the clutch operator prevailing at the beginning of a clutch actuation can be set as a function of the wear of the clutch by a preceding work stroke of the pin, which work stroke comprises a clutch actuation stroke and a wear tracking stroke. At the same time, the clutch actuator according to the invention is actuated by a control unit in each case separately for the larger work stroke of the pin, which comprises the wear tracking stroke and the clutch actuation stroke and, for a smaller work stroke, which comprises only the clutch actuation stroke. As a consequence, a wear tracking operation also takes place at the same time as the clutch actuation stroke only in some of the work strokes of the clutch actuator, while the initial position of the clutch operator is adjusted in the wear tracking direction. In contrast, only the constantly equally large clutch actuation stroke is carried out in the remaining work strokes. For example, a work stroke with wear tracking is carried out only after a multiplicity of pure clutch actuation strokes, and the next work stroke with wear tracking is carried out in turn only after a multiplicity of pure clutch actuation strokes. As a consequence of this, the proportion of the work stroke which is required for wear tracking in every step of wear tracking is very small compared with the pure clutch actuation stroke, with the result that the work stroke, which is to be made available overall by the clutch actuator, comprises almost completely the pure clutch actuation stroke. As a consequence, the work stroke is substantially shorter than in the prior art, with the result that the clutch actuator can be dimensioned to be smaller and consequently less expensive. Moreover, the pin of the clutch actuator assumes an advantageous dual function, as it is provided firstly for clutch actuation and at the same time for wear tracking.

The control unit is configured, for example, in such a way that, when the detected clutch wear has exceeded a predefined value and a request signal is present for clutch actuation, the control unit triggers in the clutch actuator a work stroke which includes the wear tracking stroke and the clutch actuation stroke. As a result, one criterion is defined for when a work stroke with wear tracking is to take place.

In order to apply pressure to the pressure chamber of the cylinder-piston unit or to relieve the pressure, there are usually electromagnetic valves. In order to make it possible to replace these valves with as low an assembly complexity as possible in the case of a defect in the valves, the valves of the cylinder-piston unit protrude at least partially out of the transmission housing.

Furthermore, a wear tracking device is preferably provided with a spindle drive, it being possible for an axially fixed spindle of the spindle drive to be screwed in the clutch actuation direction in the clutch operator which forms the nut and is held fixedly in terms of rotation, the spindle being coupled rotatably to an actuator of the wear tracking device.

According to one particularly preferable development, the actuator is formed by a toothed disk having a circumferential crown gear, a wear tracking stroke corresponding to at least the tooth pitch of the toothed disk, as viewed in the circumferential direction. The wear travel which has been set can then be detected by counting the wear tracking strokes and can be stored in a readable memory of the control unit, for example in an EEPROM. The current clutch wear can then be read out from the memory at any time and the clutch can be replaced within the context of a preventative maintenance operation when the wear limit has been reached.

The gear mechanism, which converts a rotational movement of the rotary element into a linear movement of the clutch operator, preferably comprises a spindle drive, in which the clutch operator forms the nut and the spindle can be coupled rotationally to the rotary element. The spindle is guided axially fixedly and the clutch operator is guided rotationally fixedly. This type of gear mechanism is very inexpensive on the one hand, and on the other a large range of transmission ratios can be covered, for example by the use of recirculating ball spindle drives.

The spindle and the nut of the spindle drive for actuating the disengagement bearing during a clutch actuation stroke are preferably identical to the spindle and to the nut of the wear tracking device, with the result that these components advantageously perform a dual function. The number of components of the clutch actuator and, as a consequence, also the manufacturing costs are thus reduced.

The rotary element can advantageously be coupled rotationally by a coupling device to the toothed disk, which is connected fixedly in terms of rotation to the spindle of the spindle drive. The coupling device is then configured in such a way that the toothed disk is always coupled fixedly in terms of rotation to the rotary element in a smaller work stroke of the pin, which includes only the clutch actuation stroke, while the coupling device permits a defined relative rotation between the toothed disk and the rotary element in the larger work stroke of the pin, which includes the wear tracking stroke and the clutch actuation stroke, in order to move the initial position of the clutch operator for the following work stroke in a direction which compensates at least partially for the wear of the clutch.

The coupling device includes, for example, at least one coupling element which is guided movably on the rotary element, can engage into toothed intermediate spaces of the crown gear and can be actuated by coming into contact with a stop during the larger work stroke, which includes the wear tracking stroke and the clutch actuation stroke.

According to a further embodiment, the gear mechanism which converts a rotational movement of the rotary element into a linear movement of the clutch operator can have a rotary disk, on which the pin is articulated eccentrically, having a ramp-shaped toothing system which engages in a complementary ramp-shaped toothing system of a further axially displaceable mating disk which is held fixedly in terms of rotation and is coupled to the clutch operator. As a result of this, an extremely simple construction provides for a conversion of the linear pin movement perpendicularly with respect to the center axis of the clutch into a linear movement of the clutch operator in the direction of the center axis and, at the same time, an advantageously high force transmission ratio. In order to minimize wear phenomena and frictional losses, the two toothing systems are roller-mounted relative to one another according to a further advantageous measure, for example by the use of ball bearings.

In this exemplary embodiment, in the larger work stroke of the pin which comprises the wear tracking stroke and the clutch actuation stroke, the toothed disk can be set in rotation such that the initial position of the clutch operator for the following work stroke is moved in a direction which compensates at least partially for the wear of the clutch, and such that, in a smaller work stroke of the pin which comprises only the clutch actuation stroke, the toothed disk cannot be set in rotation.

Other objects, advantages and novel features of the present invention will become apparent from the following detailed description of the invention when considered in conjunction with the accompanying drawings.

DETAILED DESCRIPTION OF THE DRAWINGS

Figure 1:
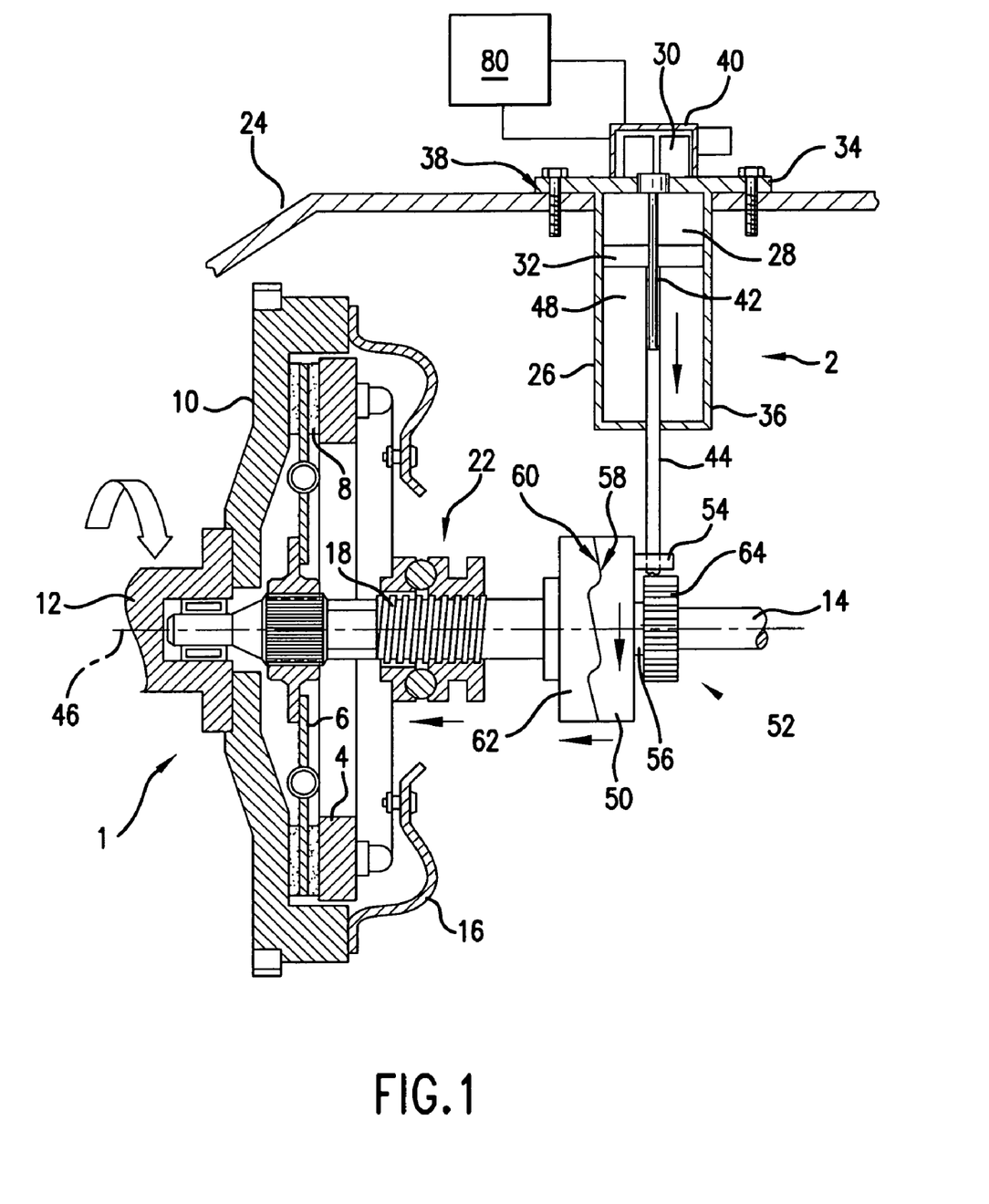
FIG. 1 shows a diagrammatic sectional illustration of a clutch of a commercial vehicle, which clutch is actuated by a clutch actuator according to a first embodiment of the invention.

The friction clutch, which is shown in FIG. 1 and is denoted overall by the designation 1, of a commercial vehicle between a drive engine and a transmission is preferably a single-disk dry clutch, which is actuated by a clutch actuator 2 according to the invention in accordance with a first embodiment.

The friction clutch 1 includes a pressure plate 4, a clutch plate 6 to which two friction linings 8 are adhesively bonded or riveted, and a further friction surface which is formed by an engine flywheel 10. The engine flywheel 10 and the pressure plate 4 are connected to an output shaft 12 of the drive engine, and the clutch plate 6 is connected to a transmission input shaft 14. For force transmission when the friction clutch 1 is closed, a disk spring 16 clamps the clutch plate 6 between the pressure plate 4 and the engine flywheel 10. In order to open the friction clutch 1, for example for a gear change operation, a disengagement bearing 22 which can be screwed by means of a thread 20 on a threaded tube 18 which surrounds the transmission input shaft 14 coaxially relieves the pressure plate 4 from the disk spring 16. To be more precise, the threaded tube 18 can be screwed into or out of the disengagement bearing 22, which is held fixedly in terms of rotation.

The clutch actuator 2 has an actuating unit which is arranged at least partially within a transmission housing 24 of the drive engine of the commercial vehicle, preferably in the form of a cylinder-piston unit 26, which can be actuated by pressure medium and has a pressure chamber 28 which can be acted on by compressed air or hydraulic fluid via solenoid valves 30, in order to actuate a linearly guided piston 32. For this purpose, the cylinder-piston unit 26 is introduced through an opening into the transmission housing 24, until an end-side collar 34 of a cylinder 36 of the cylinder-piston unit 26 bears against a fastening flange 38 of the transmission housing 24 and is fastened there, for example, by means of screws. The cylinder-piston unit 26 is preferably fastened on or in the transmission housing 24 such that solenoid valves 30 which protrude from the end side of the cylinder 36 for applying pressure to the pressure chamber 28 or relieving the latter of pressure are accessible from outside with regard to the transmission housing 24. In the present case, the solenoid valves 30 are then encapsulated by a valve housing 40, which is placed from outside onto the solenoid valves 30 and is fastened to the transmission housing 24. A distance measuring system 42, which measures the traveled path of the piston 32, is also integrated in the cylinder 36.

As an alternative, the cylinder-piston unit 26 can also be configured with an electric motor, as is described, for example, in DE 100 14 225 A1. There is a linearly actuated pin 44 present in any case, irrespective of how the actuating force is generated, which pin 44 is arranged substantially in a plane which is perpendicular with respect to the center axis 46 of the friction clutch 1. In the present case of a cylinder-piston unit 26 which is actuated by a pressure medium, the pin is preferably formed by a central piston tube 44, which is fastened perpendicularly on the piston 32 and protrudes out of the cylinder 36 on the clutch side. The piston tube 44 is guided on a rod 48 of the distance measuring system 42, which generates a signal depending on the penetration depth of that section of the rod 48 which is situated within the piston tube 44.

The necessary result of the described arrangement is the vertical position of the cylinder-piston unit 26 shown in FIG. 1, perpendicularly with respect to the center axis 46 of the friction clutch 1. At the end, the piston tube 44 is articulated eccentrically via a pivot 54 on a rotary element 50, which is coaxial with respect to the center axis 46 of the friction clutch 1, of a gear mechanism 52 which converts a rotational movement into a linear movement of the disengagement bearing 22. Here, the piston tube 44 is preferably of one-piece configuration, but could also comprise a plurality of sections which are fastened to one another and are arranged parallel or at right angles to one another, for example, on account of the installation requirements.

It is crucial that a linear movement can be transmitted by the piston tube 44 to the rotary element 50 such that the latter can be set in rotational motion. As is apparent from FIG. 2, it is necessary for this purpose that an imaginary extension of the piston tube 44 is spaced apart a little from the center axis of the rotary element 50, which is identical to the center axis 46 of the friction clutch 1. The rotary element is preferably a rotary disk 50 which is held axially fixed but rotatable on an inner tube 56 which is held telescopically in an axially displaceable but rotationally fixed manner within the threaded tube 18 which bears the disengagement bearing 22, for example by means of splined shaft profiles which engage in one another. The piston tube 44 is articulated eccentrically on this rotary disk 50 by way of the pivot 54.

Figure 2:
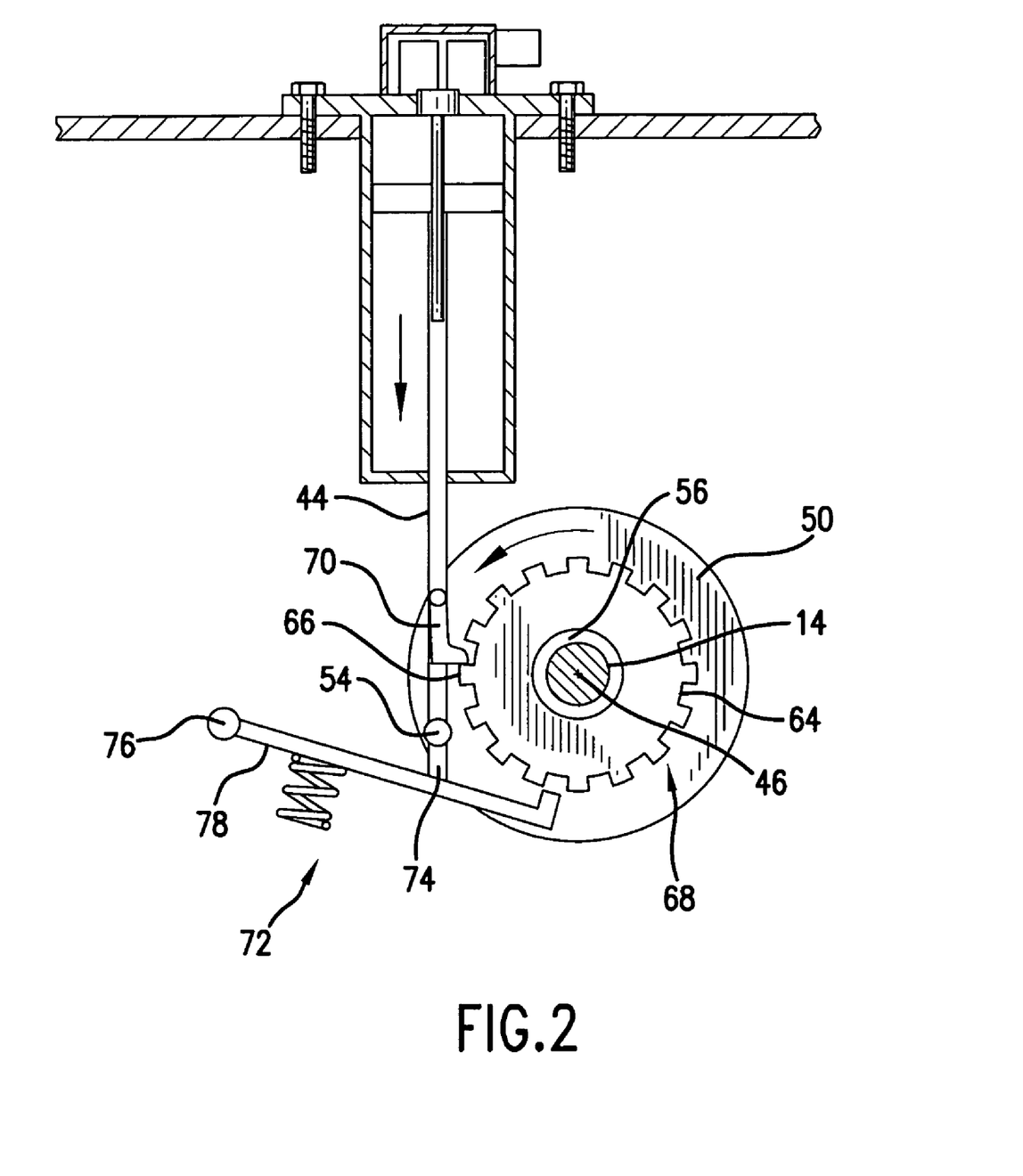
FIG. 2 shows a front view of the clutch actuator from FIG. 1.

The rotary disk 50 has a ramp-shaped toothing system 58 which extends axially and engages in a complementary ramp-shaped toothing system 60 of a mating disk 62 which is connected axially fixedly to the threaded tube 18 and is held fixedly in terms of rotation with respect to the surroundings. As a result, the mating disk 62 is coupled axially to the disengagement bearing 22. The inner tube 56 protrudes on the side which points away from the disengagement bearing 22 through a central through hole of the rotary disk 50 and is connected fixedly at the end to a toothed disk 64, which makes contact with the rotary disk 50 on the end side. Moreover, the transmission input shaft 14 protrudes out of the end of the inner tube 56 on which the toothed disk 64 is arranged, in order to extend further into the transmission housing 24.

A roller bearing which acts in the circumferential direction, for example a ball bearing, is preferably arranged between the ramp-shaped toothing systems 58, 60, in order to minimize wear and friction. Moreover, a restoring spring is provided which pushes the rotary disk 50 back with regard to the mating disk 62 into the position which is shown in FIG. 1, in which the two toothing systems 58, 60 engage completely in one another and the friction clutch 1 is in the engaged state. As an alternative, the piston 32 can be prestressed in the engaged direction by a restoring spring which is held within the cylinder 36.

However, the roller bearing and the restoring spring are not shown in FIG. 1 for reasons of scale.

If the pressure chamber 28 of the cylinder-piston unit 26 is then acted on by pressure medium, the piston 32 is displaced downward in accordance with the arrow direction shown in FIG. 1, the rotary disk 50 being set in rotation in the arrow direction counter to the action of the restoring spring on account of the eccentric articulation of the piston tube 44. As a result, the ramp-shaped toothing systems 58, 60 slide along one another in the circumferential direction, as a result of which the mating disk 62 is pushed away in the axial direction from the rotary disk 50 which is supported axially on the toothed disk 64. As, secondly, the mating disk 62 is held axially fixedly on the threaded tube 18, the latter moves to the left with regard to the axially fixedly held inner tube 56 and drives the disengagement bearing 22 in the process. The disengagement bearing 22 is then displaced axially in the direction which is shown by the arrow in FIG. 1, as a result of which the pressure plate 4 is relieved of the disk spring 16. The friction clutch 1 is then in the disengaged state. For engagement, relieving the pressure in the pressure chamber 28 brings about an upward displacement of the piston 32 and thus a return rotation of the rotary disk 50 into the position which is shown in FIG. 1, in which the two toothing systems 58, 60 again engage completely in one another.

FIG. 2 shows the situation in which, in a longer work stroke which includes a wear tracking stroke and a clutch actuation stroke, a tooth 66 of the crown gear 68 of the toothed disk 64 can be made contact with by a driver 70 which protrudes laterally away from the pin 44, and the toothed disk 64 can be set in rotation together with the inner tube 56 and the threaded tube 18, in such a way that the disengagement bearing 22 is displaced in a direction which compensates at least partially for the wear of the friction clutch 1. It is also readily contemplated by way of FIG. 2 that, in a shorter work stroke of the pin 44, which includes only the clutch actuation stroke, the tooth 66 is not reached by the driver 70 and, as a consequence, no rotation of the toothed disk 64 and thus also no displacement of the disengagement bearing 22 on the threaded tube 18 take place. The driver 70 is preferably articulated and shaped on the pin 44 such that it can swivel out laterally during a return stroke of the pin 44 and, as a consequence, passes the teeth of the crown gear 68 which lie opposite it, without the toothed disk 64 being set in rotation.

In order to lock the rotational freedom of the toothed disk 64, a locking device 72 is provided, which can be unlocked by the free end 74 of the pin 44 which protrudes beyond the pivot 54 only if the pin 44 performs the work stroke which includes both the wear tracking stroke and the clutch actuation stroke. In the other case, that is to say in a pure clutch actuation stroke of the pin 44, the displacement path is not sufficient to unlock the locking device 72. The locking device 72 preferably includes a lever 78 which can engage in the crown gear 68, is spring-loaded in the engagement direction, is articulated on a pivot 76 which is fixed to the housing, is disengaged from the crown gear 68 by the pin 44 only in the case of a work stroke which includes the wear tracking stroke and the clutch actuation stroke, and otherwise remains engaged in a spring-loaded manner with the crown gear 68, that is to say in a pure clutch actuation stroke.

With the clutch actuator 2 which is described in the preceding text, the initial position of the disengagement bearing 22 prevailing at the beginning of a clutch actuation can be set as a function of the wear of the friction clutch 1 by a preceding work stroke of the pin 44, which work stroke includes the clutch actuation stroke and the wear tracking stroke. At the same time, the clutch actuator 2 according to the invention is actuated by a control unit 80 in each case separately for the work stroke which includes the wear tracking stroke and the clutch actuation stroke and for a work stroke which includes only the clutch actuation stroke. The control routines of the control unit 80 are preferably configured such that a wear tracking stroke takes place at the same time as the clutch actuation stroke only in some of the work strokes of the clutch actuator 2, while the initial position of the disengagement bearing 22 is adjusted in the wear tracking direction. In contrast, only the constantly equally large clutch actuation stroke is carried out in the remaining work strokes.

The current position of what is known as the driving point of the friction clutch 1 is preferably crucial for triggering a work stroke with an included wear tracking stroke, the driving point characterizing the closing point of the friction clutch 1 and moving as the clutch wear increases. The position of the driving point can be detected by the distance measuring system 42, which supplies a corresponding signal to the control unit 80. The control unit 80 is configured in such a way that, when the clutch wear which results from the current position of the driving point has exceeded a predefined value and a request signal is present for clutch actuation, the control unit 80 triggers in the clutch actuator 2 a work stroke which includes the wear tracking stroke and the clutch actuation stroke, as has been described in the preceding text. Finally, there is provision for it to be possible for the wear travel, which has been set, to be detected by counting the wear tracking strokes and to be stored in a readable memory of the control unit 80, for example an EEPROM. Every wear tracking stroke preferably comprises a rotation of the toothed disk 64 by one tooth. The current clutch wear can be read out from the memory at any time and the friction clutch can be replaced within the context of a preventative maintenance operation when the wear limit has been reached.

It goes without saying that the clutch actuator 2 according to the invention can be used not only to actuate a single-disk dry clutch but for any type of clutch, for example for a wet friction clutch or a multidisk clutch.

Figure 3:
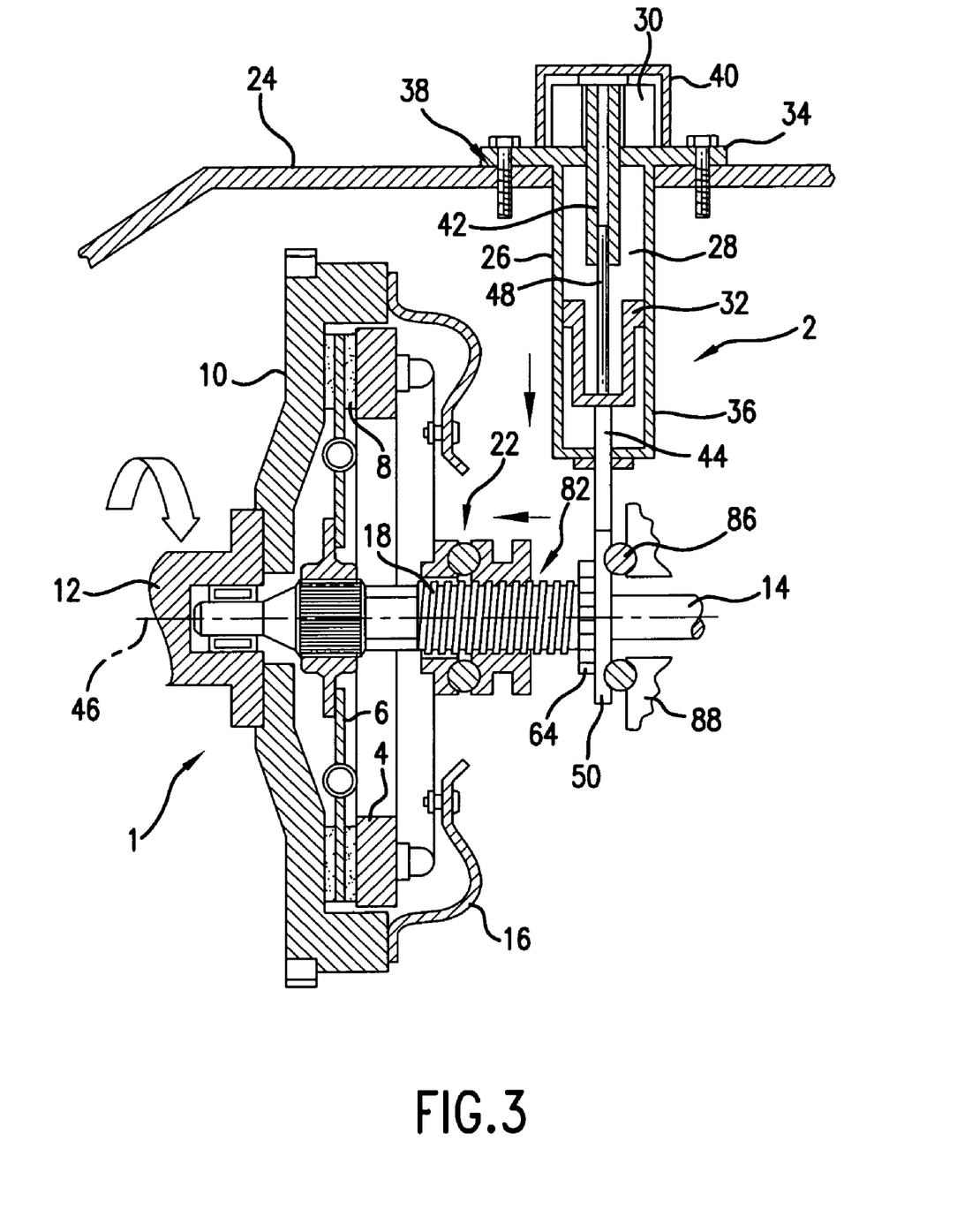
FIG. 3 shows a diagrammatic sectional illustration of a clutch of a commercial vehicle, which clutch is actuated by a clutch actuator according to a further, preferred embodiment of the invention.
Figure 4:
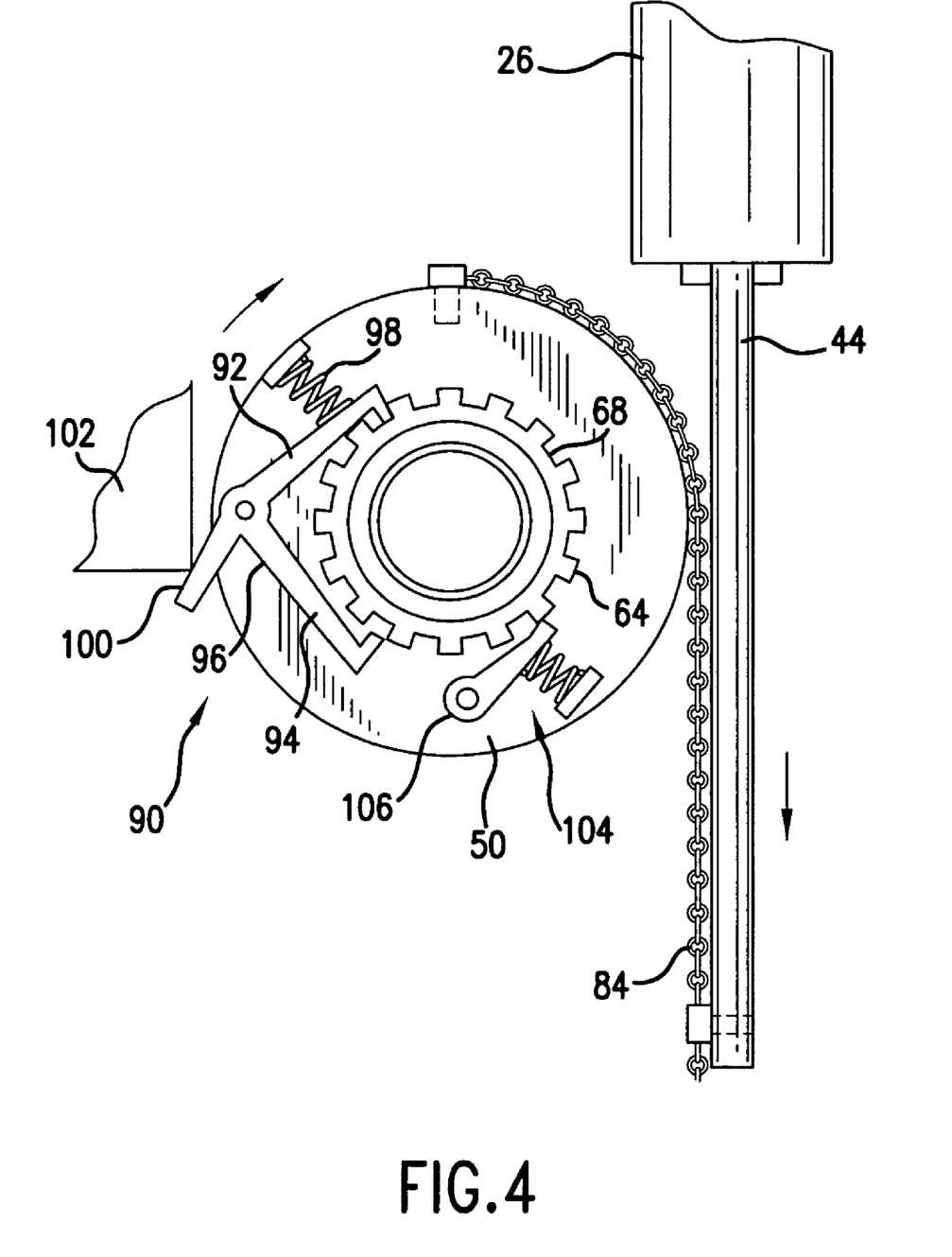
FIG. 4 shows a side view of the clutch actuator from FIG. 3, in a first position of wear tracking.

In a further, preferred exemplary embodiment of the invention according to FIGS. 3 and 4, the parts which remain the same and function in the same way compared with the previous example are characterized by the same designations. In contrast to the previous example, the gear mechanism which converts a rotational movement of the rotary disk 50 into a linear movement of the disengagement bearing 22 comprises a spindle drive 82, in which the disengagement bearing 22 forms the nut and a spindle tube 18 is coupled rotationally to the rotary disk 50, the spindle tube 18 being guided axially fixedly and the disengagement bearing 22 being guided rotationally fixedly. On its outer circumference, the spindle tube 18 has a thread with a large pitch. The thread is configured in such a way that a disengagement movement of the disengagement bearing 22, which is sufficient for the clutch actuation, is produced by rotation of the spindle tube 18. For example, the spindle drive 82 can be realized by a recirculating ball spindle, with the result that a movement profile which is low in friction and wear is possible even in the case of great clutch forces and a high number of clutch actuations.

Furthermore, the piston rod 44 is not connected directly to the rotary disk 50, but rather via a pulling element 84, for example a belt or a chain, as FIG. 4 shows. The chain 84 which is preferably to be used is fastened eccentrically at one end, for example, to the circumference of the rotary disk 50 and is wound up at least over a partial circumference on the rotary disk 50 when the clutch is closed. At the other end, it is connected to the end of the piston rod 44. As a consequence, a linear movement (illustrated by the arrow in FIG. 4) of the piston rod 44 causes a rotational movement of the rotary disk 50 in the clockwise direction. A return rotation of the rotary disk 50 is ensured with the aid of a spring (not shown). If a recirculating ball spindle with a large thread pitch is used as the spindle drive 82, it is also possible in some circumstances to dispense with a spring of this type, as the disk spring 16 of the friction clutch presses onto the disengagement bearing 22 with a great force. The same work stroke of the piston rod 44 can cause a greater rotational angle of the rotary disk 50 than in the exemplary embodiment which is described in the previous text by the use of the pulling element 84; furthermore, the inclination of the piston 32 to tilt is less pronounced.

The rotary disk 50, which is supported on a transverse wall 88 of the transmission housing 24 by an axial bearing 86 can be coupled rotationally by a coupling device 90 to the coaxial toothed disk 64 which is in turn connected fixedly in terms of rotation to the spindle tube 18 of the spindle drive 82. The coupling device 90 is configured in such a way that the toothed disk 64 is always coupled fixedly in terms of rotation to the rotary disk 50 in a smaller work stroke of the piston rod 44 which includes only the clutch actuation stroke, while the coupling device 90 permits a defined relative rotation between the toothed disk 64 and the rotary disk 50 in the larger work stroke of the piston rod 44 which includes the wear tracking stroke and the clutch actuation stroke, in order to move the initial position of the disengagement bearing 22 for the following work stroke in a direction which compensates at least partially for the wear of the friction clutch 1.

The functions which are described in the preceding text can be realized, for example, by the fact that the coupling device 90 includes at least one coupling element 96 which is articulated on the rotary disk 50 and can engage into tooth intermediate spaces of the crown gear 68 with two limbs 92, 94 which lie on the crown gear side. A prestressed spring 98 acts on one limb 92 of the coupling element 96 in such a way that the limb 92 is prestressed into a tooth gap of the crown gear 68. In this position, the other limb 94 is situated in a disengaged position, that is to say not in engagement with the crown gear 68. The rotary disk 50 is then connected fixedly in terms of rotation to the crown gear 64 by the limb 92 of the coupling element 96. If the piston rod 44 then performs the smaller work stroke which includes only the clutch actuation stroke, the rotational movement which is introduced into the rotary disk 50 is transmitted rigidly to the toothed disk 64, in order to be transmitted from there to the spindle tube 18, the rotation of which moves the disengagement bearing 22 which acts as a spindle nut in the clutch actuation direction, whereupon the friction clutch moves into its open state.

Figure 5:
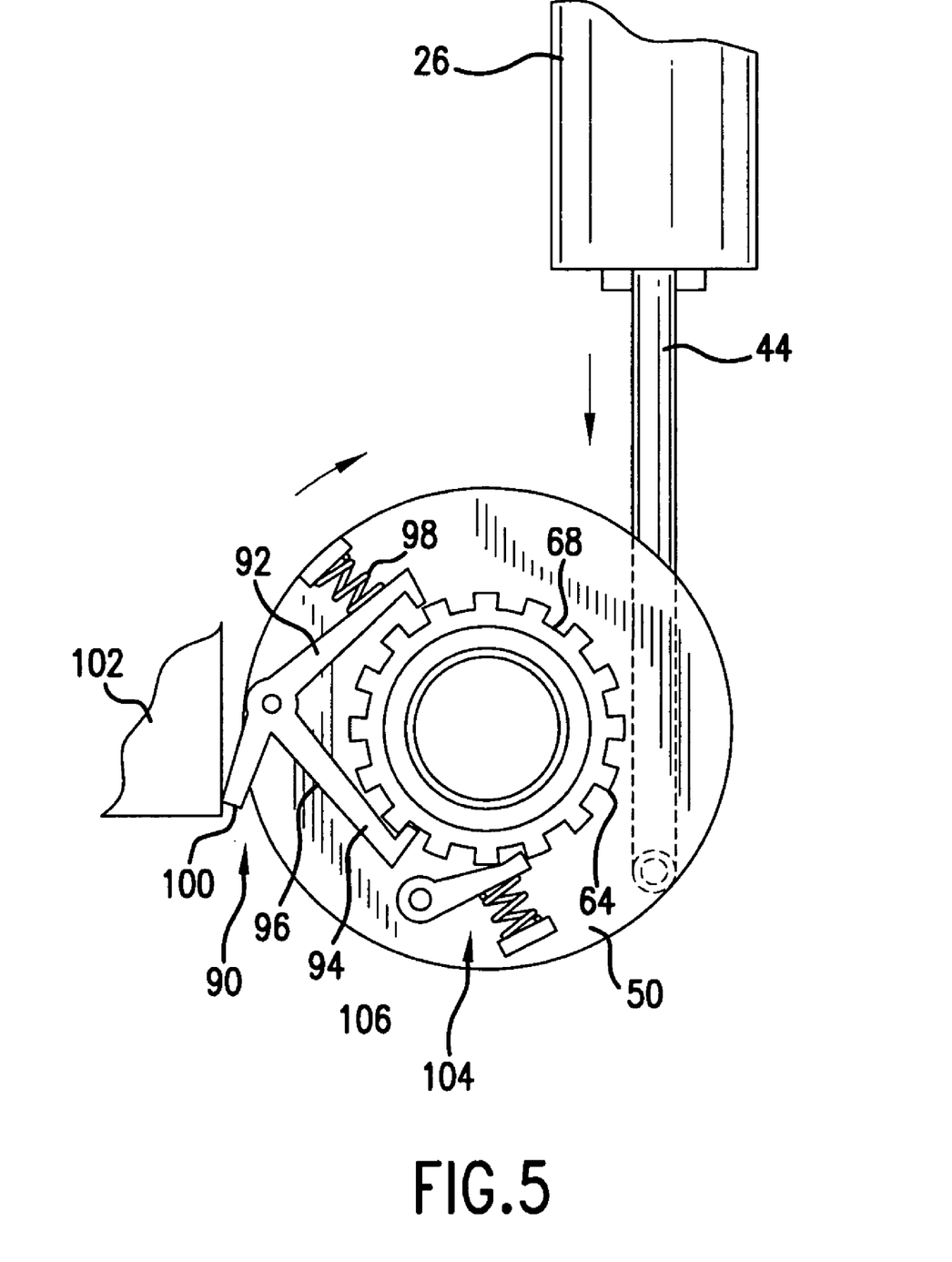
FIG. 5 shows a side view of a further embodiment of a clutch actuator, in a second position of wear tracking.

If, in contrast, the piston rod 44 performs a greater work stroke which includes the clutch actuation stroke and the wear tracking stroke, the rotational angle of the rotary disk 50 is increased and a further limb 100 of the coupling element 96 comes into contact with a fixed stop 102, as a result of which a rotation of the coupling element 96 is caused relative to the rotary disk 50, as is evident from FIG. 5, in which, in a deviation from the exemplary embodiment of FIG. 4, the drive of the rotary disk 50 is once again realized by a direct articulation of the piston rod 44, but all further components or functions are identical to those in the embodiment of FIG. 4.

The two limbs 92, 94 of the coupling element 96 which lie on the crown gear side are configured in such a way that, during the period in which one limb 92 disengages from the crown gear 68 counter to the action of the spring 98, the other limb 94 which was previously disengaged engages into a tooth gap of the crown gear 68. Here, the temporal sequence of the disengagement of one limb 92 and the engagement of the other limb 94 in the crown gear 68, and the spacing of the two limbs 92, 94 in the circumferential direction and other relevant geometrical factors are adapted to one another such that the toothed disk 64 comes to a standstill briefly during the pivoting movement of the coupling element 96, while the rotary disk 50 which continues to be driven by the piston rod 44 rotates further, preferably by exactly one tooth spacing. The toothed disk 64 is then displaced in the counterclockwise direction by one tooth with respect to the rotary disk 50, which results in a displacement of the axial initial position of the disengagement bearing 22 for the following work stroke in a direction which compensates at least partially for the wear of the friction clutch 1. In FIG. 3, this means an axial displacement of the disengagement bearing 22 to the right when the friction clutch 1 is closed.

A reverse rotation lock 104, for example in the form of a claw 106 which is prestressed against the crown gear 68 by a spring, ensures that the toothed disk 64 does not rotate back into its old position again during closing of the friction clutch 1.

| Table of Reference Numbers | |
|---|---|
| 1 | Friction clutch |
| 2 | Clutch actuator |
| 4 | Pressure plate |
| 6 | Clutch plate |
| 8 | Friction linings |
| 10 | Engine flywheel |
| 12 | Output shaft |
| 14 | Transmission input shaft |
| 16 | Disk spring |
| 18 | Threaded tube |
| 20 | Thread |
| 22 | Disengagement bearing |
| 24 | Transmission housing |
| 26 | Cylinder-piston unit |
| 28 | Pressure chamber |
| 30 | Solenoid valves |
| 32 | Piston |
| 34 | Collar |
| 36 | Cylinder |
| 38 | Flange |
| 40 | Valve housing |
| 42 | Distance measuring system |
| 44 | Piston tube |
| 46 | Center axis |
| 48 | Rod |
| 50 | Rotary disk |
| 52 | Gear mechanism |
| 54 | Pivot |
| 56 | Inner tube |
| 58 | Toothing system |
| 60 | Toothing system |
| 62 | Mating disk |
| 64 | Toothed disk |

-continued

Table of Reference Numbers

| | |
|---|---|
| 66 | Tooth |
| 68 | Crown gear |
| 70 | Driver |
| 72 | Locking device |
| 74 | End |
| 76 | Pivot |
| 78 | Spring |
| 80 | Control device |
| 82 | Spindle drive |
| 84 | Pulling element |
| 86 | Axial bearing |
| 88 | Transverse wall |
| 90 | Coupling device |
| 92 | Limb |
| 94 | Limb |
| 96 | Coupling element |
| 98 | Spring |
| 100 | Limb |
| 102 | Stop |
| 104 | Reverse rotation lock |
| 106 | Claw |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A clutch actuator for actuating a clutch arranged between a drive engine and a transmission of a vehicle, the clutch actuator comprising:
    a cylinder-piston unit having a piston that includes a piston rod forming a linearly actuable pin, the piston being actuated by a pressure medium and the pin being oriented substantially in a plane perpendicular with respect to a center axis of the clutch;
    a gear mechanism having a rotary element operatively configured to convert rotational movement of the rotary element into a linear movement of a clutch operator that is arranged coaxially with respect to the center axis of the clutch, wherein the pin is coupled eccentrically to the rotary element;
    wherein an initial position of the clutch operator prevailing at a beginning of a clutch actuation is settable as a function of a wear of the clutch by a preceding work stroke of the pin, which work stroke comprises a clutch actuation stroke and a wear tracking stroke;
    wherein a control unit actuates the clutch actuator in each case separately for a larger work stroke of the pin which comprises the wear tracking stroke and the clutch actuation stroke and for a smaller work stroke of the pin which comprises only the clutch actuation stroke; and
    wherein a sensor is provided for detecting a current clutch wear directly or indirectly and for supplying a corresponding signal to the control unit.

2. The clutch actuator as claimed in claim 1, wherein the control unit is configured such that, when the detected clutch wear has exceeded a predefined value and a request signal is present for clutch actuation, said control unit triggers in the clutch actuator a work stroke of the pin which comprises the wear tracking stroke and the clutch actuation stroke.

3. The clutch actuator as claimed in claim 2, wherein the pin is actuated electrohydraulically.

4. The clutch actuator as claimed in claim 3, wherein the pin is one of: articulated directly on the rotary element, and connected to the rotary element by a pulling element.

5. The clutch actuator as claimed in claim 4, wherein an imaginary extension of the piston rod is spaced apart a little from the center axis of the rotary element.

6. The clutch actuator as claimed in claim 5, wherein the cylinder-piston unit is arranged at least partially within a transmission housing of a drive engine of the commercial vehicle.

7. The clutch actuator as claimed in claim 6, further comprising valves for applying pressure to a pressure chamber of the cylinder-piston unit and/or relieving the latter of pressure, said valves protruding at least partially out of the transmission housing.

8. The clutch actuator according to claim 1, wherein the clutch actuator is operatively configured for use in a commercial vehicle.

9. A clutch actuator for actuating a clutch arranged between a drive engine and a transmission of a vehicle, the clutch actuator comprising:
    a cylinder-piston unit having a piston that includes a piston rod forming a linearly actuable pin, the piston being actuated by a pressure medium and the pin being oriented substantially in a plane perpendicular with respect to a center axis of the clutch;
    a gear mechanism having a rotary element operatively configured to convert rotational movement of the rotary element into a linear movement of a clutch operator that is arranged coaxially with respect to the center axis of the clutch, wherein the pin is coupled eccentrically to the rotary element;
    wherein an initial position of the clutch operator prevailing at a beginning of a clutch actuation is settable as a function of a wear of the clutch by a preceding work stroke of the pin, which work stroke comprises a clutch actuation stroke and a wear tracking stroke; and
    further comprising a wear tracking device comprising a spindle drive, wherein an axially fixed spindle of the spindle drive is screwable in the clutch actuation direction in the clutch operator, the clutch operator forming a nut and being held fixedly in terms of rotation.

10. The clutch actuator as claimed in claim 9, wherein the spindle is coupled rotatably to an actuator of the wear tracking device.

11. The clutch actuator as claimed in claim 10, wherein the actuator is formed by a toothed disk having a circumferential crown gear, a wear tracking stroke corresponding to at least a tooth pitch of the toothed disk, as viewed in the circumferential direction.

12. The clutch actuator as claimed in claim 11, wherein the wear travel which has been set is detectable by counting the wear tracking strokes and is storable in a readable memory of a control unit.

13. The clutch actuator as claimed in claim 12, wherein, in the larger work stroke of the pin which comprises the wear tracking stroke and the clutch actuation stroke, the toothed disk can be set in rotation such that the initial position of the clutch operator for the following work stroke is moved in a direction which compensates at least partially for the wear of the clutch, and wherein, in a smaller work stroke of the pin which comprises only the clutch actuation stroke, the toothed disk cannot be set in rotation.

14. The clutch actuator as claimed in claim 13, wherein the gear mechanism which converts a rotational movement of the rotary element into a linear movement of the clutch operator has a rotary disk, on which the pin is articulated eccentrically, having a ramp-shaped toothing system which engages in a complementary ramp-shaped toothing system of an axially displaceable mating disk which is held fixedly in terms of rotation and is coupled to the clutch operator.

15. The clutch actuator as claimed in claim 14, wherein a telescopic device which surrounds a drive engine shaft or transmission shaft is provided, comprising an inner part and an outer part which is displaceable axially and fixedly in terms of rotation on the former and is formed by the spindle of the spindle drive.

16. The clutch actuator as claimed in claim 15, wherein the spindle is formed by a tube and the rotary disk is held rotatably but axially fixedly on a section of the inner part which protrudes out of the tube, and the mating disk is held fixedly rotationally and axially on the tube.

17. The clutch actuator as claimed in claim 16, wherein the toothed disk is connected fixedly in terms of rotation to the inner part.

18. The clutch actuator as claimed in claim 17, wherein the toothed disk is lockable rotationally by a locking device which can only be unlocked by the pin when it performs a work stroke which comprises the wear tracking stroke and the clutch actuation stroke.

19. The clutch actuator as claimed in claim 12, wherein the gear mechanism which converts a rotational movement of the rotary element into a linear movement of the clutch operator comprises a spindle drive, in which the clutch operator forms the nut and the spindle can be coupled rotationally to the rotary element, the spindle being guided axially fixedly and the clutch operator being guided rotationally fixedly.

20. The clutch actuator as claimed in claim 19, wherein the spindle and the nut of the spindle drive of the gear mechanism are formed by the spindle and the nut of the wear tracking device.

21. The clutch actuator as claimed in claim 20, wherein the rotary element is coupleable rotationally by a coupling device to the toothed disk which is connected fixedly in terms of rotation to the spindle.

22. The clutch actuator as claimed in claim 21, wherein the coupling device is configured such that the toothed disk is always coupled fixedly in terms of rotation to the rotary element in a smaller work stroke of the pin which comprises only the clutch actuation stroke, while the coupling device permits a defined relative rotation between the toothed disk and the rotary element in the larger work stroke of the pin which comprises the wear tracking stroke and the clutch actuation stroke, in order to move the initial position of the clutch operator for the following work stroke in a direction which compensates at least partially for the wear of the clutch.

23. The clutch actuator as claimed in claim 22, wherein the coupling device comprises at least one coupling element which is guided movably on the rotary element and is engageable into tooth intermediate spaces of the crown gear.

24. The clutch actuator as claimed in claim 23, wherein the coupling element is actuable by coming into contact with a stop during the larger work stroke of the pin which comprises the wear tracking stroke and the clutch actuation stroke.

25. The clutch actuator according to claim 9, wherein the clutch actuator is operatively configured for use in a commercial vehicle.

* * * * *